June 23, 1970 R. SCHWARTZ ET AL 3,517,305
MAGNETIC TAPE TESTER IN WHICH, AFTER COMPARISON WITH
A STANDARD, AN ERRONEOUS SIGNAL IS STORED
FOR LATER ANALYSIS
Filed Oct. 22, 1968 5 Sheets-Sheet 1

INVENTORS.
ROBERT SCHWARTZ
MARVIN SCHWARTZ
RONALD ZUSSMAN
BY Philip Schneider
Leon D. Cozzelino
ATTORNEYS June 23, 1970 R. SCHWARTZ ET AL 3,517,305

MAGNETIC TAPE TESTER IN WHICH, AFTER COMPARISON WITH A STANDARD, AN ERRONEOUS SIGNAL IS STORED FOR LATER ANALYSIS

Filed Oct. 22, 1968 5 Sheets-Sheet 2

INVENTORS.
ROBERT SCHWARTZ
MARVIN SCHWARTZ
RONALD ZUSSMAN

BY Philip Schneider
Lorin B. Applebaum
ATTORNEYS

MAGNETIC TAPE TESTER IN WHICH, AFTER COMPARISON WITH A STANDARD, AN ERRONEOUS SIGNAL IS STORED FOR LATER ANALYSIS

Filed Oct. 22, 1968 5 Sheets-Sheet 3

INVENTORS.
ROBERT SCHWARTZ
MARVIN SCHWARTZ
RONALD ZUSSMAN
BY Philip Schneider
Leon D. Cuzzleton
ATTORNEYS June 23, 1970 R. SCHWARTZ ET AL 3,517,305

MAGNETIC TAPE TESTER IN WHICH, AFTER COMPARISON WITH A STANDARD, AN ERRONEOUS SIGNAL IS STORED FOR LATER ANALYSIS

Filed Oct. 22, 1968 5 Sheets-Sheet 4

INVENTORS.
ROBERT SCHWARTZ
MARVIN SCHWARTZ
RONALD ZUSSMAN
BY Philip Schneider
Lou B. Applebaum
ATTORNEYS INVENTORS.
ROBERT SCHWARTZ
MARVIN SCHWARTZ
RONALD ZUSSMAN
BY Philip Schneider
Leon B. Coggleshaw
ATTORNEYS United States Patent Office 3,517,305
Patented June 23, 1970

3,517,305

MAGNETIC TAPE TESTER IN WHICH, AFTER COMPARISON WITH A STANDARD, AN ERRONEOUS SIGNAL IS STORED FOR LATER ANALYSIS

Robert Schwartz and Marvin Schwartz, Queens, and Ronald Zussman, Kings, N.Y., assignors to the United States of America as represented by the Secretary of the Navy Filed Oct. 22, 1968, Ser. No. 769,586
Int. Cl. G01r *33/12*
U.S. Cl. 324—34 4 Claims

ABSTRACT OF THE DISCLOSURE

Logic circuitry for comparing data recorded on a magnetic tape with the same data stored in a plurality of registers and for producing an error signal whenever there is a discrepancy therebetween. The error signals are addressed by a binary counter and gated to a computer for storage. Gating and timing circuits provide for the signal synchronization.

The invention described herein may be manufactured and used by or for the Government of the United States of America for governmental purposes without the payment of any royalties thereon or therefor.

This invention relates to means for determining the merit of digital tape and especially to means that permit errors on a recorded digital tape to be isolated, addressed and fed into a computer memory.

In ordinary automated computer operation, spaced transmissions of small units of information are forwarded from the tape unit to the computer. The size of the units of information are commensurate with the size of the storage memory within the computer. Thus, the tape unit operates in a start-stop method, skipping sections of tape. This mode of operation prevents error analysis over the full reel of tape, so that, to analyze the recordings on a complete reel of tape using a computer on a continuous basis, the tape unit has to be modified.

At the present time, tape certifiers are used to check errors on the tape. A tape certifier is basically a tape recorder with specially designed recording, play-back and detection electronics and associated counters. The tape which is to be certified is recorded with a predetermined, specified recording format or pattern. The tape is played back and the play-back signal is compared with the originally recorded signal. Errors are tabulated on a counter.

The difficulty with tape certifiers is that they do not provide the actual conditions which the tape is subjected to on the tape transport of the computer with which the tape will be used. Furthermore, certification does not locate the addresses or positions of erroneous bits—it merely totalizes them.

An object of the present invention is to premit continuous, on-line, error analysis of a full reel of magnetic tape on the actual tape transport with which the tape is to be used.

Another object is to permit error analysis of every bit location on a reel of magnetic tape.

A further object is to permit the on-line operation of any digital recorder reproducer peripheral device.

Still another object is to detect relative positions of errors, thereby permitting computerized defect and skew testing.

A further object is to provide logic circuitry which permits the comparison of a predetermined bit pattern with the same pattern upon play-back from a magnetic tape.

An error signal is generated whenever comparison results in a discrepancy. Each error signal is addressed and forwarded to the computer memory for later analysis by the computer.

Other objects, advantages and novel features of the invention will become apparent from the following detailed description of the invention when considered in conjunction with the accompanying drawings wherein.

To implement the present invention, a "black box" 10 is inserted between a computer, such as the Univac 1218, for example, and its magnetic tape unit 12, also designated "MTU" hereinafter. The MTU 12 contains tape heads, and amplifying and detecting circuitry. The "black box" 10 contains equipment which isolates the errors on a reel of prerecorded tape, addresses the errors and sends the addressed error data to the computer memory.

Figure 1:
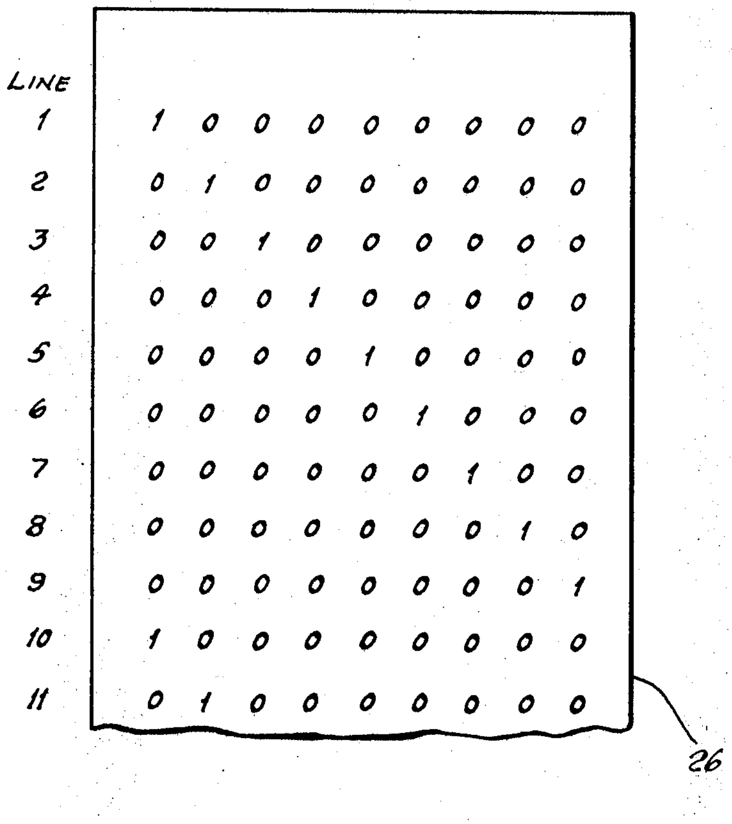
FIG. 1 is an illustration of a nine-word test pattern which might be recorded on the tape.

The reel of tape is recorded with a binary digit pattern appropriate for testing a certain type of tape defect; for example, the nine-word pattern shown in FIG. 1 is appropriate for testing the tape for skew. A pattern of all 1's would be used to test the tape for dropouts. A small portion of the tape 26 is shown in this figure. It is apparent that nine different words are recorded on lines 1 through 9, each word having a single one and eight zero digits, the one digit being displaced one bit location to the right as the line number increased. After line 9, the pattern simply repeats itself. Reading such a nine-digit word (e.g., the word on line 1) requires nine tape heads and associated amplifiers and detectors.

Figure 2:
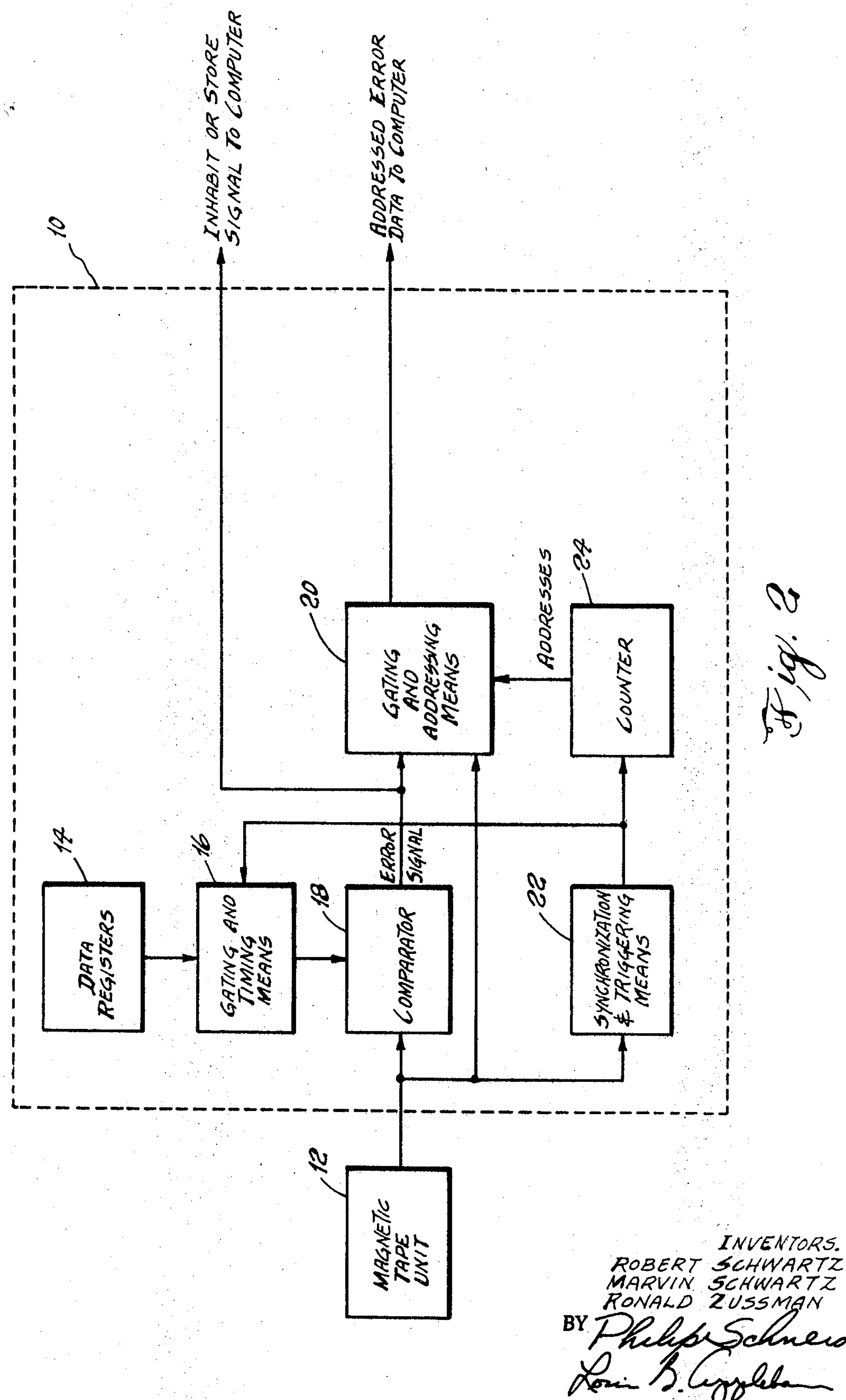
FIG. 2 is a bloc schematic diagram of an embodiment of the invention.

Each of the test words is recorded in a different test-pattern storage means, preferably a register. These, collectively, are called the data registers 14 in FIG. 2. Gating and timing means 16 then permit the word which is the test standard for the word being read off by the MTU 12 to be sent to the comparator 18 from the proper register. If there is an error signal, it is fed to the gating and addressing means 20.

At the same time, the signal (nine bits) from the MTU 12 is fed to the synchronization and triggering means 22 which synchronizes the previously mentioned gating and timing means 16 and triggers the counter 24. The latter feeds the count in binary numbers (although any number system may be used) to the gating and addressing means 20. A signal is sent to the computer only if an error is present, the signall consisting of the incorrect word on the tape plus an address number.

Figure 3:
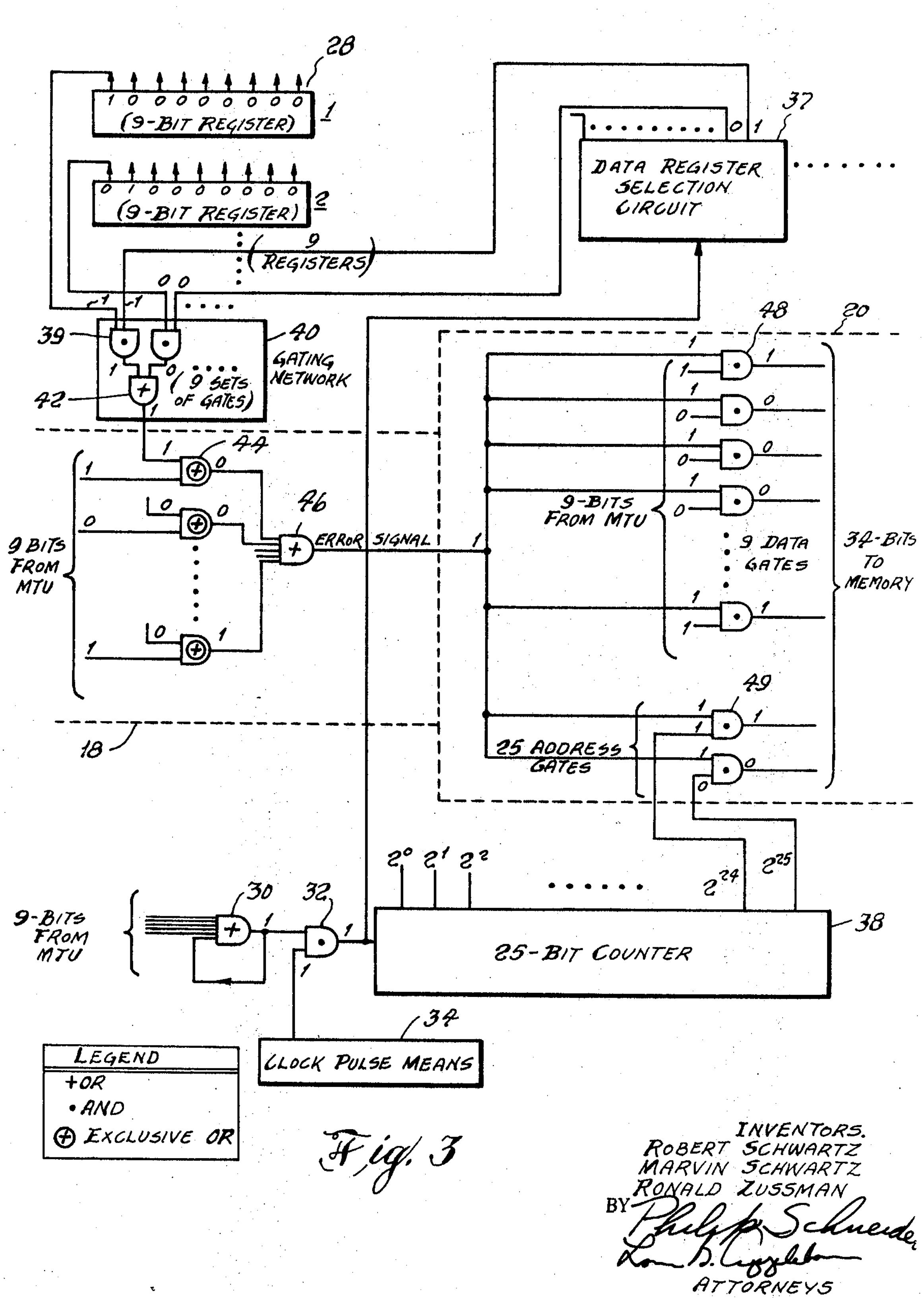
FIG. 3 is a schematic diagram showing a more detailed implementation of the blocks of FIG. 2.

FIG. 3 shows in more detail one implementation of the invention; other implementations are possible. (Where the circuits are well known to the art only blocks or conventional symbols are used.) For the test signal which has been assumed (nine bits) and for the specific circuits being used, it is convenient to employ nine registers. Each holds one word of the nine-word test pattern and each is a nine-bit register since there are nine bits in each word.

Assume, now, that the first word (first line on the tape) is being read by the MTU 12. Since a "1" is present, the OR gate 30 provides a "1" output to the AND gate 32. Once started, the OR gate 30 provides a constant output signal at the 1-signal level, since the output is fed back to the input. Clock pulse means 34 then provides clock pulses to the AND gate 32 at the proper time to provide a 1 output pulse from this gate to the input of a ring counter data register selection circuit which is part of the synchronization and triggering means 22.

The output pulses of the AND gate 32 are also supplied to a binary counter 38 which supplies a different address number for each pulse, or count. A 25-bit counter is shown although the number of bits depends on the capacity (total number of tape characters) of the computer tape tested and the mode of counting is optional. The finite amount of core storage memory will limit the total number of addressed errors which can be stored in the computer.

Figure 4:
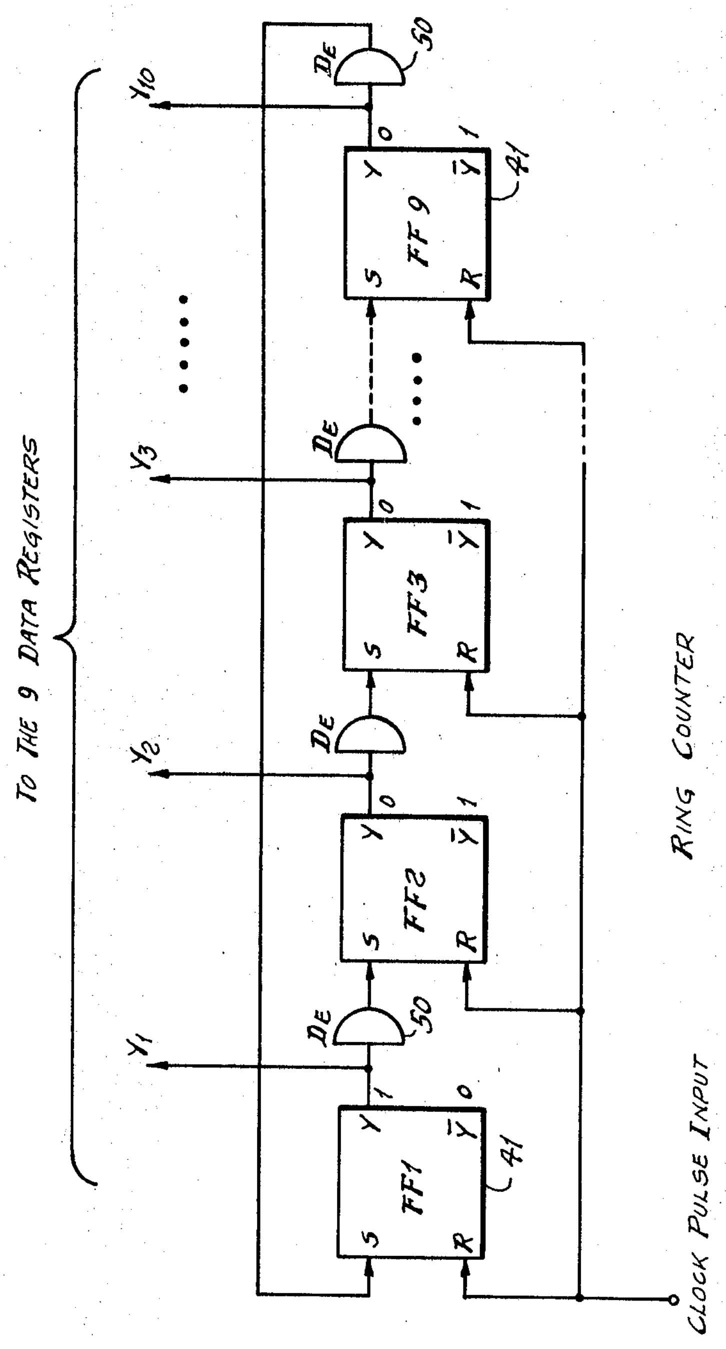
FIG. 4 is a schematic diagram of circuits which can be employed in the data register selection circuit.

FIG. 4 shows that the data register selection circuit 37 comprises a 9-bit ring counter. The output of each flip-flop 41 is connected to a different one of the gating network AND gates 39. The selection circuit 37 acts to shift the 1 output sequentially along the flip-flops 41 from the first to the ninth Y output line and then back to the first for repeated cyclings.

Initially, the first of the nine flip-flops in the ring counter (data register selection circuit 37) is set, while the other eight flip-flops are reset. These nine flip-flop outputs are transmitted to gating network 40. Gating network 40 is a selection matrix of nine sets of AND and OR gates, nine ANDS and one OR per set. When the first ring counter flip-flop is set, the contents of the first 9-bit register are gated to the comparator 18. When the second ring counter flip-flop is set, the contents of the second register are gated to the comparator. Delay element means 50 is placed between the flip-flops 41 to prevent false triggering.

The comparator 18 comprises a set of nine exclusive-OR gates 44 which provide a 0 output when the inputs are the same (i.e., 0, 0 or 1, 1) and a 1 output when the inputs are different (i.e., 0, 1 or 1, 0). There are two inputs to each exclusive OR gate—one from one of the sets of gates in the gating network 40 and the associated one of the nine bits from the MTU 12. Thus, if each bit in the word from the MTU 12 matches each bit in the reference word from the first (or appropriate) register 28, the inputs to the OR gate 46 of the comparator 18 are all 0 and its output is 0, but if there is one (or more) discrepancy, or error, there will be one (or more) 1 signal at the input of the OR gate 46 and therefore a 1 output. The 1 output of the OR gate 46 is known as the "error signal."

The output of the OR gate 46 of the comparator 18 is fed in parallel to each AND gate 48 in the gating and addressing means 20. There are nine data gates 48 for handling nine bits which come from the MTU 12, each bit going to a different one of the nine gates, and there are 25 gates which handle the 25 bits coming from the 25-bit binary counter 38. If less (or more) bits were used in the address numbers less (or more) address gates 49 would be required.

Figure 5:
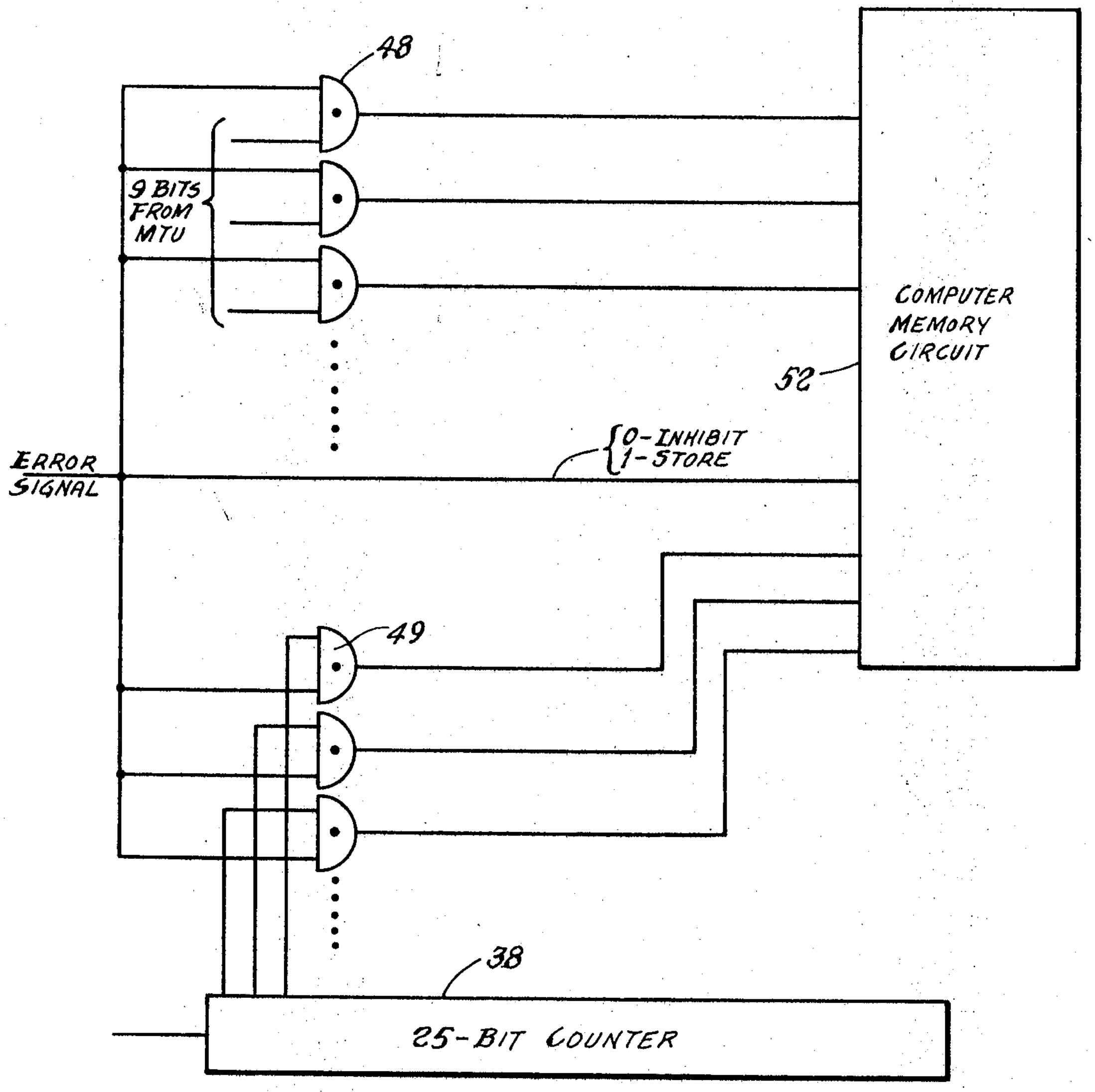
FIG. 5 is a schematic diagram showing the memory inhibit circuit.

When no error signal is sent to the gating and addressing means gates 48 and 49, the output of all the gates is 0. When an error signal (a 1 signal) is sent to the gates, the word read off the magnetic tape by the MTU 12 and an address number for it appears at the outputs of the gates 48 and 49 and are sent to the computer memory 52 to be stored. One type of circuit which accomplishes this result is shown in FIG. 5. It is customary to provide the computer with control as well as data lines. The error signal is used to transmit control information to the computer. A 1 error signal informs the computer that a 9-bit character and its associated address appear on the 34 data lines; the computer is requested to store these 34-bits in its memory. This 1 error signal is commonly called an "external interrupt." A 0 error signal indicates to the computer that there are no data bits for it to store and that it is free to do other work; the computer is thus inhibited from storing the 34 data bits in its memory.

Obviously many modifications and variations of the present invention are possible in the light of the above teachings. It is therefore to be understood that within the scope of the appended claims the invention may be practiced otherwise than as specifically described.

We claim:

1. Magnetic-tape testing apparatus for comparing the data recorded on a reel of magnetic tape with a predetermined test pattern of digital signals comprising different digital words with which the recorded data should be identical, said testing apparatus being used with a magnetic tape unit and a computer having a memory circuit and an inhibit circuit for permitting or preventing the storage of incoming signals, said testing apparatus comprising:

a plurality of test-pattern storage means for storing said predetermined test pattern of digital test words, said means being arranged in an order corresponding to the order in which their associated stored words are recorded on said tape;

comparator means connected to said storage means and said magnetic tape unit for comparing the digital signals in said test-pattern storage means with the signals read off the magnetic tape by said magnetic tape unit and for producing an error signal whenever a test-pattern word and the magnetic-tape-unit output signal from its recorded replica on said tape are not identical;

gating and timing means connected between said test-pattern storage and said comparator means for permitting the test word in each said test-pattern storage means to be fed to said comparator means simultaneously with the signal read from its recorded replica on said tape by said magnetic tape unit;

means for counting the number of times a word is read from a magnetic tape and providing a digital output signal which indicates the count;

synchronization and triggering means for providing a trigger signal each time a word is read from said tape by said magnetic tape unit, said trigger signal being fed to, and activating, said gating and timing means and said means for counting; and gating and addressing means for providing a signal comprising the recorded signal and an address therefor whenever the recorded signal has one or more errors therein, said gating and addressing means having as inputs said error signal, the count signal, and the output of said magnetic tape unit, the output of said gating and addressing means being fed to said computer memory circuit and said computer inhibit circuit.

2. Apparatus as set forth in claim 1, wherein each said test-pattern storage means comprises a register.

3. Magnetic-tape-testing apparatus for comparing the data recorded on a reel of magnetic tape with a predetermined test pattern of digital signals comprising different digital words with which the recorded data should be identical, said testing apparatus being used with a magnetic tape unit and a computer having a memory circuit and comprising:

a plurality of test-pattern storage means for storing said predetermined test pattern of digital test words, said means being arranged in an order corresponding to the order in which their associated stored words are recorded on said tape;

comparator means connected to said storage means and said magnetic tape unit for comparing the digital signals in said test-pattern storage means with the signals read off the magnetic tape by said magnetic tape unit and for producing an error signal whenever a test-pattern word and the magnetic-tape-unit output signal from its recorded replica on said tape are not identical;

gating and timing means connected between said test-pattern storage means and said comparator for permitting the test word in each said test-pattern storage means to be fed to said comparator means simultaneously with the signal read from its recorded replica on said tape by said magnetic tape unit;

means for counting the number of times a word is read from a magnetic tape and providing a digital output signal which indicates the count;

synchronization and triggering means for providing a trigger signal each time a word is read from said tape by said magnetic tape unit, said trigger signal being fed to said gating and timing means and to said means for counting;

gating and addressing means for providing a signal comprising the recorded signal and an address therefor whenever the recorded signal has one or more errors therein, said gating and addressing means having as inputs said error signal, the count signal, and the output of said magnetic tape unit, the output of said gating and addressing means being fed to said computer memory circuit; and inhibiting means for providing a signal to said computer to indicate thereto that it is to store the output of said gating and addressing means when an error signal is present and that it is not to store the output of said gating and addressing means when an error signal is not present.

4. Apparatus as set forth in claim 3, wherein each said test-pattern storage means comprises a register.

References Cited

UNITED STATES PATENTS 2,774,056 12/1956 Stafford ____________ 340—149

RUDOLPH V. ROLINEC, Primary Examiner

R. J. CORCORAN, Assistant Examiner

U.S. Cl. X.R.

179—100.2; 340—146.1, 174.1